2,710,294

BLOOD FRACTIONATION

Tillman D. Gerlough, Highland Park, N. J., assignor to Olin Mathieson Chemical Corporation, New York, N. Y., a corporation of Virginia No Drawing. Application November 2, 1953, Serial No. 389,836

10 Claims. (Cl. 260—112)

This invention relates to blood fractionation, and has for its object the provision of an improved method for the fractionation of plasma to separate the albumin, gamma globulin, and other valuable fractions thereof.

Various methods for the fractionation of plasma have been developed, the most successful being based on the use of cold ethanol under precise conditions of pH, temperature, ionic strength, ethanol and protein concentration. These are described in the following sources, inter alia: U. S. Patent No. 2,390,074; U. S. Patent No. 2,469,193; J. A. C. S. 68, 459 (1946); and Encyclopedia of Chemical Technology, vol. 2 (1948), page 556. The method of almost universal choice for large-scale operation is that identified as "Method 6" and described in detail on pages 470 et seq. of the J. A. C. S. citation above. To facilitate comparison of the improved methods of this invention with this classical method, a flow-sheet and outline of Method 6 are given hereinafter. [In said flowsheet (and throughout the specification and claims), all ethanol concentrations referred to are by volume (at 25° C.), and all temperatures are in centigrade. Also, the plasma referred to is that obtained from bleedings in which 500 ml. of human blood is collected in 50 ml. 4% sodium citrate solution (or conventional acid-citrate-dextrose solution), the plasma separated from the cells by centrifugation and pooled.]

Method 6

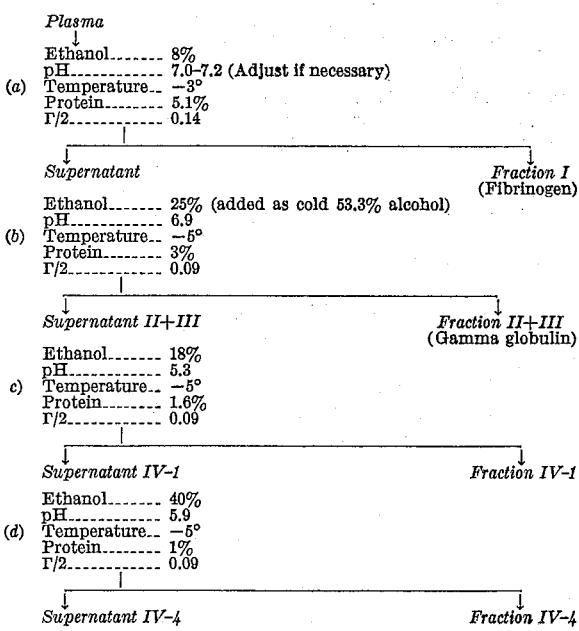

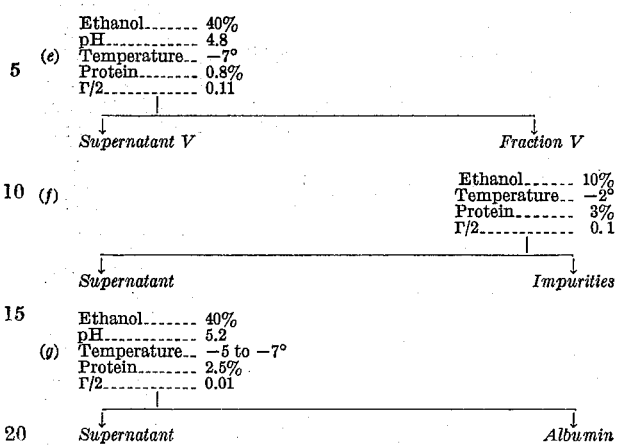

Outlining Method 6, in step $a$ crude fibrinogen is removed from the plasma by adding thereto cold 53.3% ethanol to a final concentration of 8% ethanol, the temperature being maintained at about —2.5 to 3°, and the fibrinogen is separated by centrifugation. In step $b$, 53.3% ethanol is added to the supernatant to attain a concentration of about 25% ethanol, the temperature being maintained at about —5° and the pH being adjusted to about 6.9, if necessary. The resulting precipitate (Fraction II+III) contains the immune globulins as well as other physiologically important proteins (and is usually referred to as the gamma globulin fraction); it is removed by centrifugation at about —5°. In step $c$, a fraction consisting of most of the alpha globulins (and called IV-1) is precipitated by adding water to the 25% ethanol supernatant until a concentration of about 18% ethanol is reached, and the pH is adjusted to about 5.3, the temperature being maintained at about —5°. Fraction IV-1 is removed by centrifugation. In step $d$, the ethanol concentration of the 18% ethanol supernatant is increased to 40%, and the pH adjusted to about 5.9. Under these conditions, another fraction (IV-4) is precipitated, and is then removed by centrifugation. In step $e$, the 40% ethanol supernatant is clarified by filtration through a stainless steel filter press with asbestos mats, at —5° and the albumin fraction precipitated therefrom by adjustment of the pH to 4.8±0.3 (with acetic acid-sodium acetate buffer). The precipitated albumin fraction is then removed by centrifugation, and further purified by dissolving in 10% ethanol (step $f$), and reprecipitating by adjusting the ethanol concentration to about 40% at a pH of 5.2±0.2 (step $g$). Except for the precipitation of Fraction I and the reprecipitation of albumin, the ionic strength throughout the operations is about .09.

The operation of the foregoing method at sub-zero temperatures on a large-scale requires a considerable amount of expensive stainless steel or glass-lined equipment, as well as trained operators. In view of the obvious need to expand production of such fractions as fibrinogen, gamma globulin and albumin, modification of this method to permit increased production without requiring expansion of plant or other facilities has been urgently sought. In the operation of said ethanol fractionation method, large volumes of solution must be handled and centrifuged for separation of all of the desired protein fractions, and it was obvious that if the volumes handled could be reduced markedly, increased production could be obtained in the same length of time and with the same equipment. However, in view of the substantially empirical nature of this fractionation procedure, and the fact that alteration of the proteins or of the compositions of the fractions must be avoided, it was not obvious how such reduction of volumes handled could be effected.

It has been found that a very material reduction in the total volumes of solution handled and centrifuged, as well as other advantages, are obtained by adjusting Supernatant I to such conditions as to precipitate Fraction II+III along with the IV-1 and IV-4 fractions, separately treating the resulting supernatant for recovery of albumin, and further treating Fraction II+III+IV-1+IV-4 to separate Fraction II+III (gamma globulin) from Fraction IV-1+IV-4. By virtue of this rearrangement of steps, a high ethanol concentration (obtained by addition of substantially anhydrous ethanol) is attained in the earliest stage of the process, resulting in reduced volumes to be treated in the subsequent steps for isolation of albumin.

The method of this invention essentially comprises treating plasma to precipitate a fraction consisting principally of fibrinogen, removing the precipitate, adjusting the supernatant to a pH of about 6.0-6.2 (preferably about 6.1) and an ethanol concentration of about 35-45% (preferably about 40%) by addition of cold substantially anhydrous ethanol (say a 90-100% ethanol, preferably a 95% ethanol), and separating the precipitated fraction from the supernatant. From the precipitate (Fraction II+III+IV-1+IV-4), Fraction IV-1+IV-4 may be removed by treatment of the mixture with an about 18-22% (preferably about 20%) ethanol at a pH of about 6.6-7.0 (preferably about 6.9), followed by separation of the insoluble portion (Fraction II+III, or gamma globulin). The 40% ethanol supernatant (Supernatant IV) may be treated further as described for Supernatant IV-4 in Method 6 to recover the albumin fraction.

As indicated in the following table showing the comparative volumes handled with Method 6 and with the method of this invention, the method of this invention results in an increased capacity (for the same equipment) of about 92 to 109%, as well as providing other advantages.

|  | Method 6 (liters) | Improved Method (liters) |
|---|---|---|
| Plasma | 1,000 | 1,000 |
| Supernatant I | 1,177 | 1,177 |
| Supernatant II+III | 1,873 |  |
| Supernatant IV-1 | 2,542 |  |
| Supernatant IV-4 | 3,754 | 1,857 |
| Supernatant V | 3,812 | 1,901 |
| 10% Rework | [1] 820 | [1] 820 |
| Supernatant V-R | 1,367 | 1,367 |
| Total Volume Through Centrifuges | 14,525 | [2] 6,935 |

[1] Filtered only.
[2] Recovery of Fraction II+III at one-half plasma volume involved handling an additional 633 liters, which is included in this total of 6,935 liters.

The following example is illustrative of the invention:

Example

As indicated by the following flowsheet, the conditions at which certain steps are carried out are substantially the same as the conditions of the corresponding steps of Method 6; accordingly, a detailed description of the conditions for these steps need not be included here. The pH values given in the flowsheet are final pH values; thus adjustment of the pH to 5.05 in step 4 of the example, followed by ethanol addition, results in a final pH of about 5.2.

Improved method

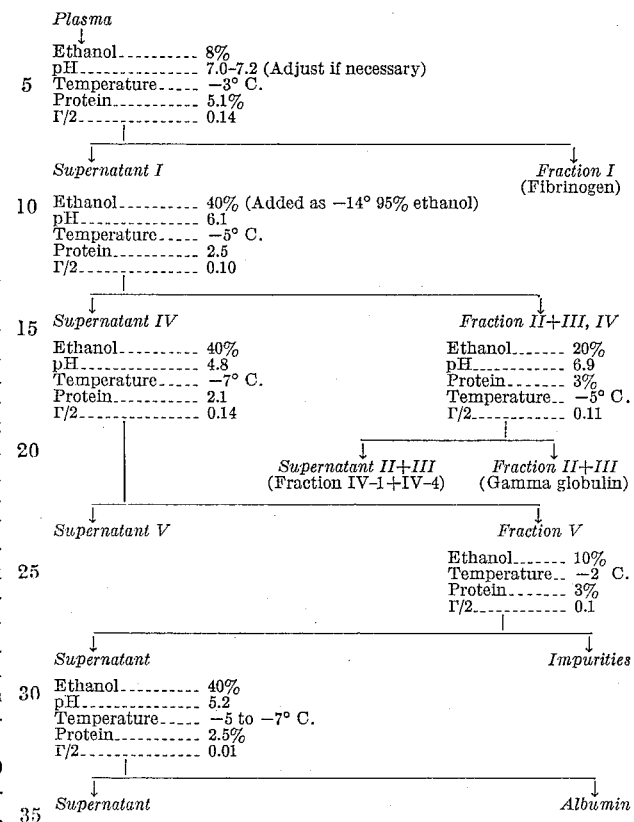

(1) Fraction I is precipitated from plasma as described in step *a* of classical Method 6.

(2) A 20 liter portion of supernatant I at pH 7.34 and —2° is adjusted to about pH 6.2 by the addition of 40 ml. of sodium acetate-acetic acid buffer; and the ethanol concentration is increased from 8% to 40% by the addition of 11.65 liters of —14° 95% ethanol, the time of addition being 2.5 hours, and the temperature being maintained at —5° during the ethanol addition. The mixture is then centrifuged at —5°, and the precipitate (Fraction II+III, Fraction IV-1, and Fraction IV-4) is held for further processing to obtain Fraction II (gamma globulin). The supernatant (Supernatant IV) is clarified by filtration under vacuum at —5° C. through an asbestos mat on a Buchner funnel using a filter aid (e. g. Hyflo Supercel).

(3) 28.7 liters clarified Supernatant IV is adjusted to pH 4.8 by the addition of 740 cc. ethanolic sodium acetate-acetic acid buffer, and the crude albumin (Fraction V) removed from the mixture by centrifugation at —7°.

(4) The crude albumin (about 2 kg. wet weight) is brought to a total volume of 20 liters at 10% ethanol concentration, then filtered under vacuum at —2° through an asbestos mat on a Buchner funnel using a filter aid; and the filtered 10% solution (about 16 liters) is brought to pH 5.05 by the addition of 90 cc. of 1 molar sodium bicarbonate solution. The ethanol concentration is then raised to 40% by the addition of 8.61 liters of —14° 95% ethanol, and the mixture centrifuged. The final albumin yield is about 1.2 kg. wet paste. After freeze-drying the powder, the weight is about 370 gms.

(3a) Fractions II+III, IV-1 and IV-4, weighing about 1.4 kg., is suspended in 7.98 liters of 0° distilled water and adjusted to pH 6.8 with sodium acetate-acetic acid buffer. The mixture is then brought to 20% ethanol concentration by the addition of 2.0 liters of —14° 95% ethanol, while lowering the temperature to —5° and maintaining that temperature during the rest of the addition. The mixture is then centrifuged at —5°, and the precipitate (Fraction II+III, about 1.2 kg. wet weight) is reworked for Fraction II (gamma globulin) according to standard procedure outlined in Method 9 (J. A. C. S. 71 541 [1949]).

Although the foregoing example is in terms of a relatively small-scale operation, it may of course be scaled up to a higher level (e. g. starting with 1,000 liters plasma) using the conventional equipment for large-scale operation.

The various precautions and techniques employed in classical Method 6 are of course employed where required in the methods of this invention. Thus, the operations are in general conducted at the lowest convenient temperatures, to minimize denaturation of the proteins; bacterial growth and its products are avoided (inter alia, by use of bacteria and pyrogen free distilled water); and the reagents (such as alcohol) are added in such manner as to avoid local high concentrations, as by slow addition (e. g., through capillary jets) and/or with thorough stirring.

The various fractions obtained are further fractionated and/or purified and packaged in the conventional manner (Fraction II+III, for example, being fractionated by Method 9 to obtain gamma globulin). The gamma globulin and albumin fractions obtained by the methods of this invention are as safe and effective for their purposes as the corresponding fractions obtained by Method 6.

The ethanol used may be of various commercial grades and/or denatured, but the impurities or denaturant must be such as to be removable in a final operation such as freeze-drying. Also, other buffers or buffer systems may be employed, with the qualification that they either be readily removable during the processing or acceptable to the clinician. The sodium acetate-acetic acid buffer system is preferred, with sodium bicarbonate preferred for increasing alkalinity.

The methods of this invention are applicable to the same extent (and with the same modifications) as Method 6 to the fractionation of human serum (eliminating fibrinogen-separation step $a$), or bovine plasma, for example.

The invention may be variously otherwise embodied within the scope of the appended claims.

I claim:

1. In the method of fractionating an aqueous solution of plasma proteins from which the fibrinogen has been removed, the step of adjusting the solution to a pH of about 6.0–6.2 and to an ethanol concentration of about 35–45% by addition of cold substantially anhydrous ethanol, and removing the precipitate.

2. In the method of fractionating plasma, the steps of treating the plasma to precipitate a fraction consisting principally of fibrinogen, removing the precipitate, then adjusting the supernatant to a pH of about 6.0–6.2 and to an ethanol concentration of about 35–40% by addition of cold substantially anhydrous ethanol, and removing the precipitate.

3. The method defined by claim 2, in which the pH is about 6.1.

4. The method defined by claim 2, in which the ethanol concentration is adjusted to about 40%.

5. The method defined by claim 2, in which the adjustment is by addition of an about 95% ethanol.

6. The method defined by claim 5, in which the ethanol added is at a temperature of the order of $-14°$.

7. The method defined by claim 2, in which the second precipitate is further treated to recover a gamma globulin fraction.

8. The method defined by claim 2, in which the second supernatant is further treated to recover an albumin fraction.

9. The method defined by claim 2, in which the second precipitate is treated with an about 18–22% ethanol at a pH of about 6.6–7.0, and the insoluble portion recovered.

10. The method defined by claim 2, in which the second supernatant is adjusted to a pH of about 4.8, and the crude albumin fraction precipitated is recovered.

References Cited in the file of this patent

UNITED STATES PATENTS

| | | |
|---|---|---|
| 2,437,060 | Williams et al. | Mar. 2, 1948 |
| 2,469,193 | Cohn | May 3, 1949 |

OTHER REFERENCES

Cohn et al., J. Am. Chem. Soc., vol. 68, pp. 459–474 (1946).

Callaham, Chem. and Met. Eng., June 1946, pp. 101–103.

Anson et al., "Advances in Prot. Chem.," vol. III, pp. 437–48 (1947).